United States Patent [19]

Shimura

[11] Patent Number: 4,928,011

[45] Date of Patent: May 22, 1990

[54] RADIATION IMAGE READ-OUT APPARATUS

[75] Inventor: Kazuo Shimura, Kanagawa, Japan

[73] Assignee: Fuji Photo Film Co., Ltd., Kanagawa, Japan

[21] Appl. No.: 325,322

[22] Filed: Mar. 17, 1989

[30] Foreign Application Priority Data

Mar. 18, 1988 [JP] Japan .................................. 63-64926
Aug. 23, 1988 [JP] Japan ................................ 63-209192

[51] Int. Cl.⁵ ............................................. G03B 42/00
[52] U.S. Cl. ................................ 250/327.2; 250/484.1
[58] Field of Search ...................... 250/327.2, 484.1 B

[56] References Cited

U.S. PATENT DOCUMENTS

| | | | |
|---|---|---|---|
| 4,258,264 | 3/1981 | Kotera et al. ...................... | 250/484.1 |
| 4,276,473 | 6/1981 | Kato et al. ........................ | 250/327.2 |
| 4,315,318 | 2/1982 | Kato et al. .............................. | 382/6 |
| 4,387,428 | 6/1983 | Ishida et al. ..................... | 364/413.13 |
| 4,527,060 | 7/1985 | Suzuki et al. ..................... | 250/327.2 |
| 4,568,832 | 2/1986 | Tanaka et al. ..................... | 250/327.2 |
| 4,611,247 | 9/1986 | Ishida et al. ......................... | 358/458 |
| 4,652,999 | 3/1987 | Higashi et al. ................ | 364/413.1 B |
| 4,768,099 | 8/1988 | Mukai .................................. | 358/403 |

*Primary Examiner*—Constantine Hannaher
*Assistant Examiner*—Edward J. Glick
*Attorney, Agent, or Firm*—Sughrue, Mion, Zinn, Macpeak & Seas

[57] ABSTRACT

A radiation image read-out apparatus comprises a preliminary read-out device, a final read-out device, an image processor, and a condition adjuster. The condition adjuster is constituted of an operating section for calculating, from a preliminary read-out image signal, a read-out condition for use in obtaining a final read-out image signal and/or an image processing condition for use in image processing of a final read-out image signal. A judging section judges the reliability of the read-out condition and/or the image processing condition calculated by the operating section. A displaying section indicates low reliability in cases where the judging section judges that the reliability of the read-out condition and/or image processing condition is low.

10 Claims, 6 Drawing Sheets

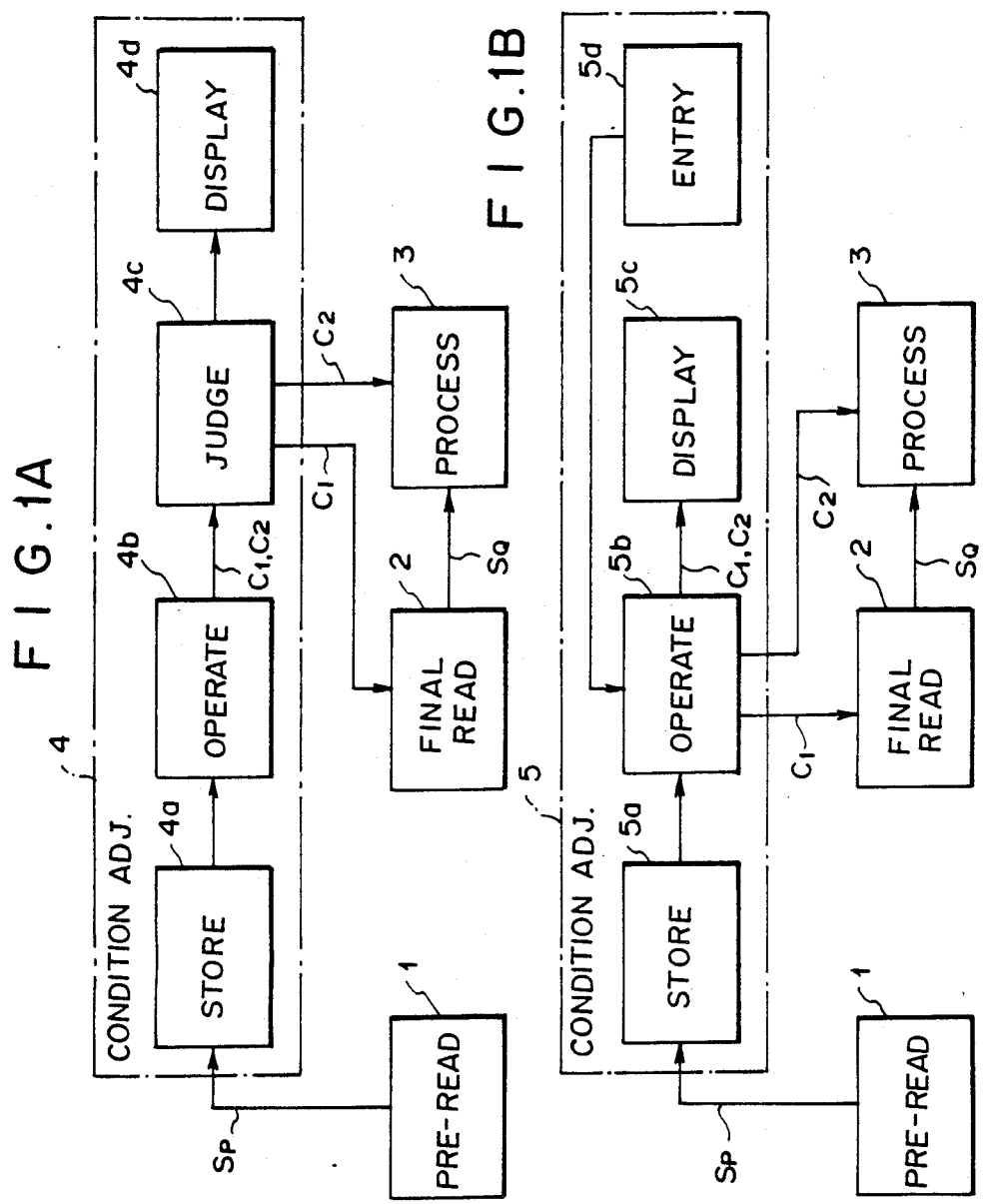

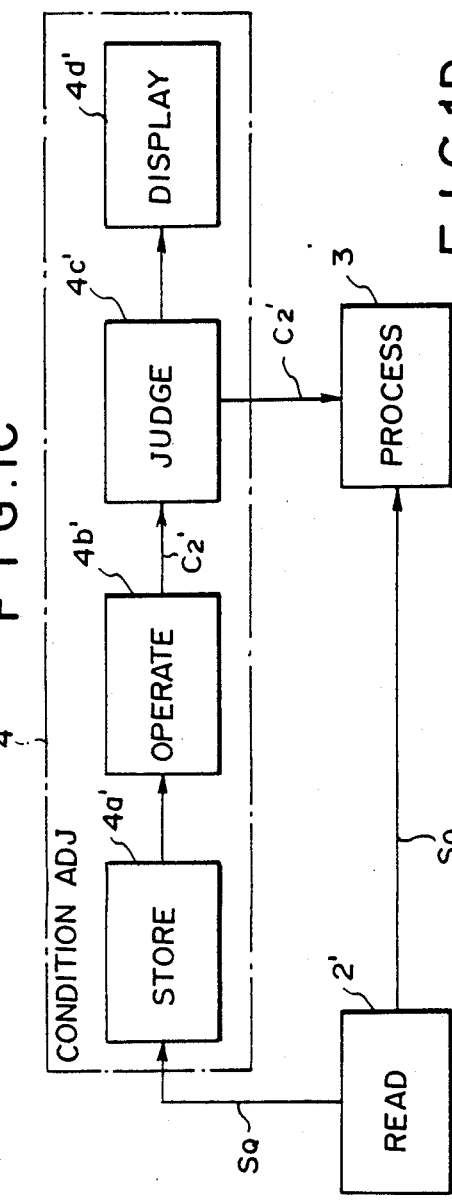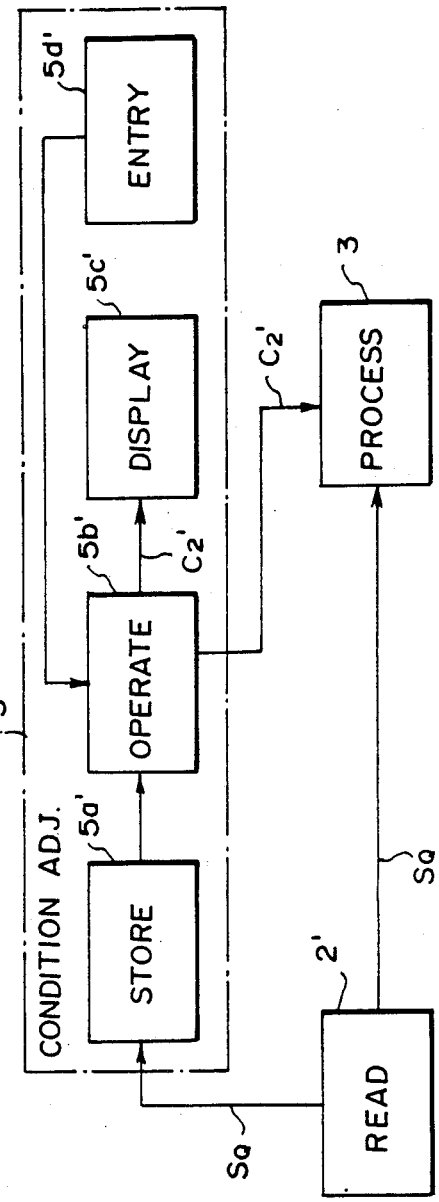

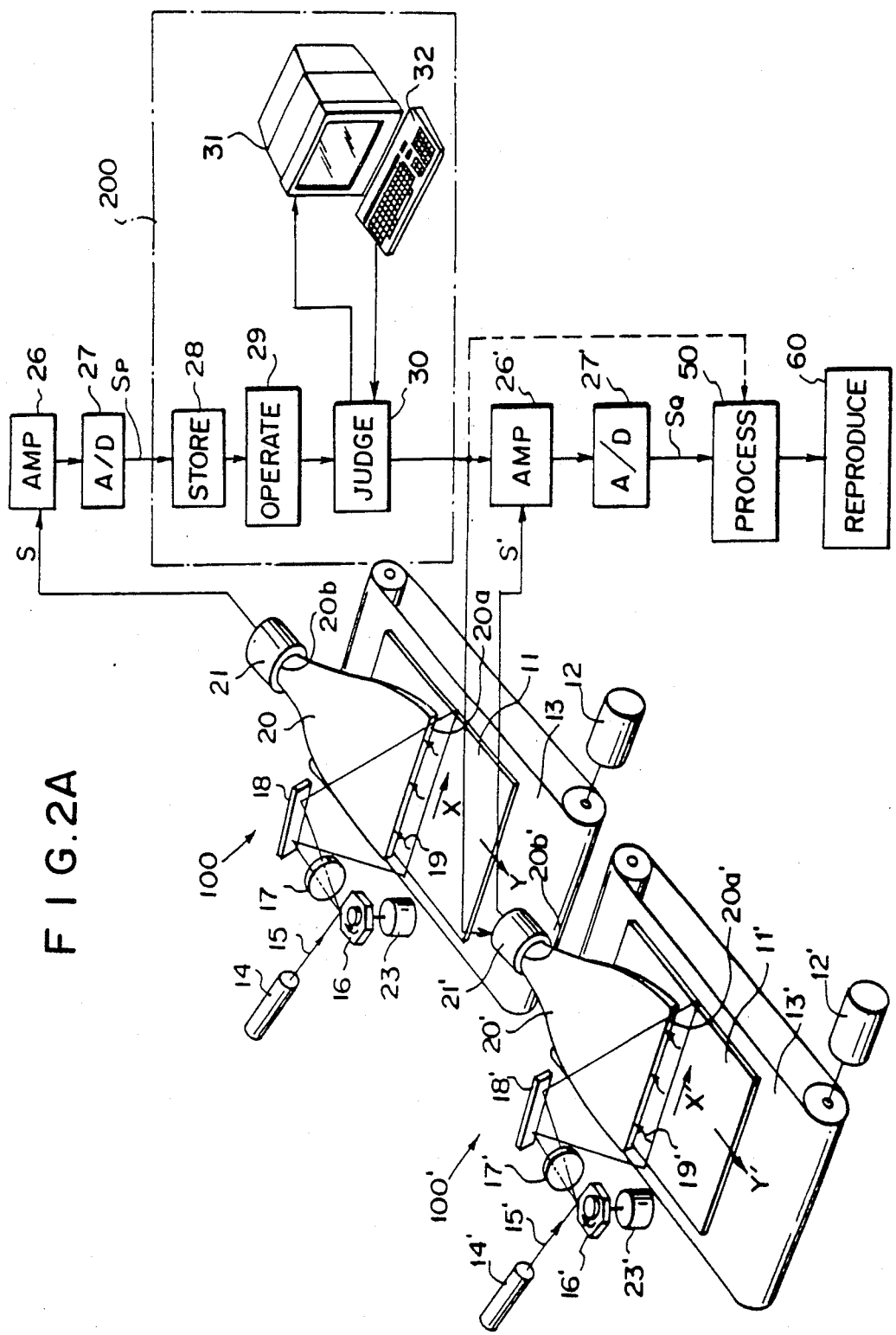

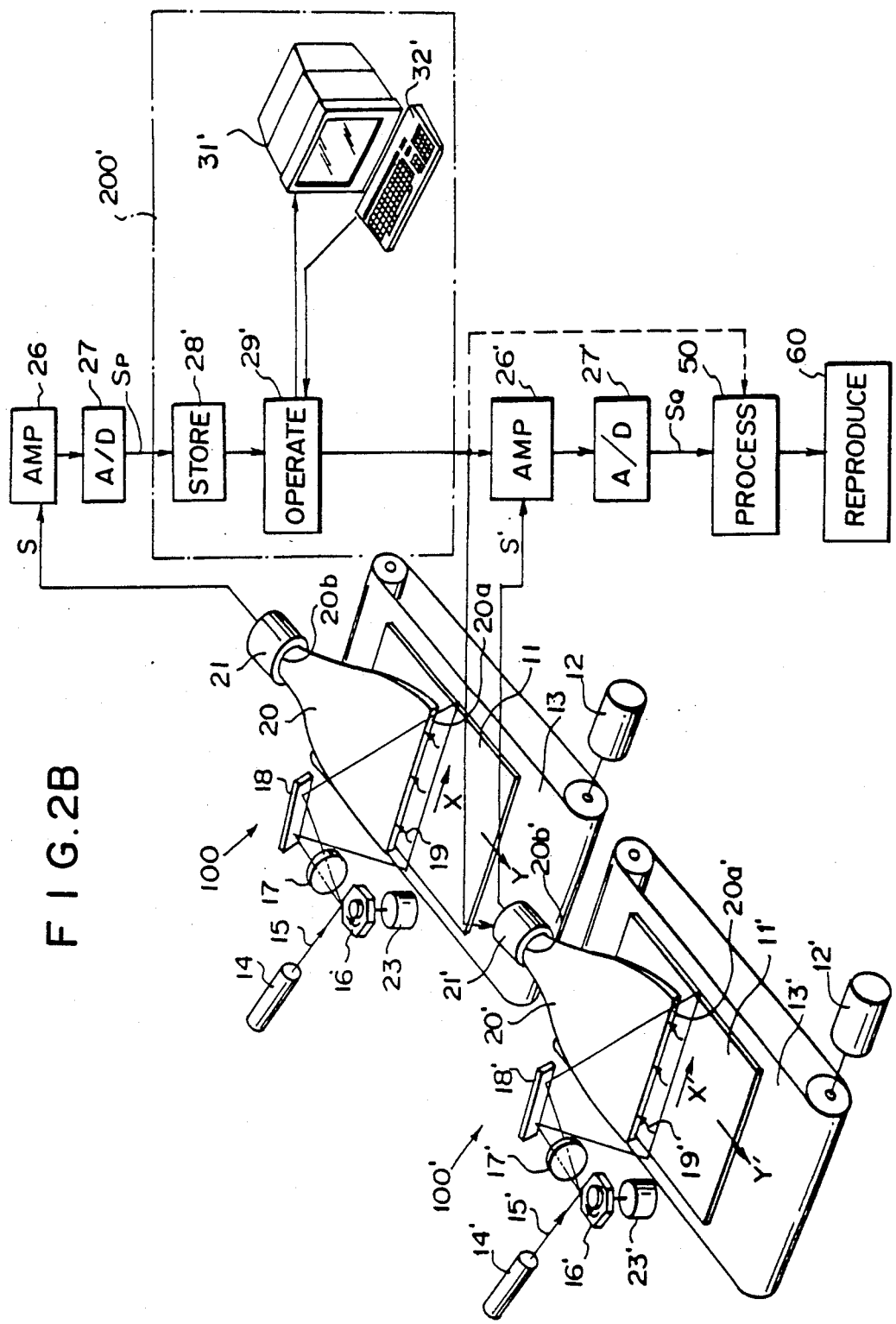

RADIATION IMAGE READ-OUT APPARATUS

BACKGROUND OF THE INVENTION

1. Field of the Invention

This invention relates to a radiation image read-out apparatus which obtains an image signal by reading out a radiation image of an object from a recording medium, such as a stimulable phosphor sheet, on which the radiation image has been recorded, and carrying out image processing of the image signal.

2. Description of the Prior Art

Techniques for reading out a recorded radiation image to obtain an image signal, carrying out appropriate image processing of the image signal, and then reproducing a visible image by use of the processed image signal have heretofore been known in various fields. For example, as disclosed in Japanese Patent Publication No. 61(1986)-5193an X-ray image is recorded on an X-ray film having a small gamma value designed for the type of image processing to be carried out, the X-ray image is read out from the X-ray film and converted into an electric signal, and the electric signal (image signal) is image-processed and then used when the X-ray image is reproduced as a visible image on a copy photograph or the like. In this manner, a visible image having good image quality and exhibiting such characteristics as high contrast, high sharpness, high graininess or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Patent Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, which is used when the radiation image of the object is reproduced as a visible image on a recording material such as photographic film, a display device such as a cathode ray tube (CRT), or the like.

A radiation image recording and reproducing system using a stimulable phosphor sheet is advantageous over conventional radiography using silver halide in that the amount of light emitted by the stimulable phosphor sheet is proportional to the energy intensity of the radiation, to which the stimulable phosphor sheet is exposed when an image is recorded thereon, and the energy intensity of said radiation may be selected from a very wide range (latitude) of radiation energy intensities. If an appropriate read-out gain is selected and used when the light emitted by said stimulable phosphor sheet is being detected, a desirable density can be obtained in the finally reproduced visible image regardless of the energy intensity of the radiation to which the stimulable phosphor sheet was exposed.

In order to assure that the conditions under which the image signal is read out are appropriate for the radiation dose to which the stimulable phosphor sheet or the like was exposed, the aforesaid radiation image recording and reproducing system may be constituted such that a preliminary read-out operation is carried out in which the stimulable phosphor sheet is scanned with a light beam having a comparatively low energy level, and the radiation image stored on the stimulable phosphor sheet is thus approximately ascertained. A preliminary read-out image signal is obtained for the preliminary read-out operation and is then analyzed. Thereafter, a final read-out operation is carried out. The conditions under which the radiation image is read out are determined on the basis of the results of an analysis of the preliminary read-out image signal. The stimulable phosphor sheet is scanned with a light beam having a comparatively high energy level, and an image signal is obtained which will be used during the reproduction of a visible image.

The term "read-out condition" as used herein means a group of conditions affecting the relationship between the amount of light emitted by the stimulable phosphor sheet during image read-out and the output of a read-out means. For example, the term "read-out condition" may refer to a read-out gain and a scale factor which defines the relationship between the input to the read-out means and the output therefrom, or the energy intensity of the stimulating rays used when the radiation image is read-out.

The term "energy level of a light beam" as used herein means the level of energy of the light beam to which the stimulable phosphor sheet is exposed per unit area. In cases where the energy of the light emitted by the stimulable phosphor sheet depends on the wavelength of the light beam, i.e. has a sensitivity which depends on the wavelength of the light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths or different intensities may be used. The intensity of a light beam may be changed by a laser beam source, or the like, or by moving an ND filter or the like into and out of the optical path of the light beam. Alternatively, the energy level of a light beam also changes when the diameter of the light beam is changed, i.e. the scanning density is changed, or when the speed with which the light beam scans the stimulable phosphor sheet is changed.

Regardless of whether a preliminary read-out operation is or is not carried out, it has also been proposed to adjust the conditions under which an image signal (or a preliminary read-out image signal) is processed on the basis of the results of an analysis of the image signal or the preliminary read-out image signal. This proposed method is applicable both when a radiation image is recorded on a recording medium such as a conventional X-ray film and when a radiation image is recorded on a stimulable phosphor sheet.

In general, an operation (hereinafter referred to as EDR) which calculates the read-out condition and/or the image processing condition on the basis of an image signal (including a preliminary read-out image signal) is performed by an algorithm. The algorithm is designed on the basis of results obtained from the statistical processing of a large number of radiation images. However, in cases where the image of a large foreign substance (for example, a lead protector used for blocking radiation) is included in the radiation image of an object or a special type of image recording is carried out, an EDR often cannot be carried out accurately. In such cases, the final read-out operation cannot be carried out with an appropriate read-out condition, and/or an appropriate type of image processing is not performed. As a result, when the image signal, which was obtained from the final read-out operation and then processed, is used to reproduce a visible image, the visible image will have a density and contrast which make it unsuitable for viewing. In the worst case, the image of the object must be rerecorded. In cases where the object is a human body, the radiation dose to the human body is doubled when image recording is repeated. This problem should be avoided because radiation is harmful to the human body.

Examples of cases where the aforesaid problems arise will be described hereinbelow.

One of the characteristics of a recorded image which should be considered when selecting the algorithms for an EDR is that unnecessary portions of an object may be recorded on a recording medium when scattered radiation impinges upon those portions. Also, radiation may impinge directly upon a portion of a recording medium without being passed through or reflected by an object. In this manner, an image signal picks up unnecessary components which must be removed in order to obtain an image signal representing only the desired portions of a radiation image.

FIGS. 4A and 4B are graphs showing probability density functions of preliminary read-out image signals SP detected by preliminary read-out operations carried out on two stimulable phosphor sheets.

FIG. 4A shows an example of the probability density function of a preliminary read-out image signal SP detected from a radiation image for which an EDR is suitable which is of the type accounting for most (for example, 99.5%) radiation images.

With reference to FIG. 4A, the values of the preliminary read-out image signal SP which were obtained by detecting the light emitted by a stimulable phosphor sheet during a preliminary read-out operation and which are proportional to the amount of light emitted are plotted on the horizontal axis, which has a logarithmic scale. The relative frequency of occurence of the values of the preliminary read-out image signal SP is plotted on the vertical axis at the upper part of the graph, and the values of the image signal obtained during the final read-out operation are plotted on a logarithmic scale on the vertical axis at the lower part of the graph. In this case, the probability density function of the preliminary read-out image signal SP is composed of projecting portions A, B and C, and it is assumed that the projecting portion B corresponds to the part of a radiation image which it is necessary to reproduce. By way of example, in order to find the projecting portion B, the values of the probability density function are compared to a predetermined threshold value T, starting with the value of the function at the minimum value SL of the preliminary read-out image signal SP and working along the direction of increase of the image signal values, i.e. along the chained line. When the probability function crosses through the threshold value T, a calculation is made to find out whether the function is rising or falling. In this manner, a second rising point "a" and a second falling point "b" are found. The maximum and minimum values of the preliminary read-out image signal at the points "b" and "a" are denoted by Smax and Smin, respectively. The read-out condition for the final read-out is set so that during the final read-out operation the image information represented by the emitted light signal for values of the emitted light falling within the range of Smax to Smin is reproduced accurately. Specifically, the read-out condition for the final read-out is set so that Smax and Smin of the preliminary read-out image signal SP are detected respectively as the maximum image signal value Qmax and the minimum image signal value Qmin in the final read-out. The maximum image signal value Qmax and the minimum image signal value Qmin in turn correspond respectively to the maximum density Dmax and the minimum density Dmin within the predetermined correct density range of the visible image ultimately reproduced. More specifically, the read-out condition for the final read-out is set so that during the final read-out operation the image information represented by values of the emitted light signal falling within the range of Smax to Smin is detected as an image signal with values lying on the straight line G shown in FIG. 4A.

In the manner described above, for most of the radiation images, the read-out condition for the final read-out can be adjusted appropriately. However, in cases where, for example, an image of a foreign substance is included in a radiation image, correct read-out conditions cannot be determined with this method. One such case will be described hereinbelow.

FIG. 4B shows the probability density function of a preliminary read-out image signal SP' detected from a radiation image of an object approximate to the object, the radiation image of which yielded the probability density function shown in FIG. 4A. In the case of both FIGS. 4A and 4B, the radiation images of the objects (by way of example, the chest of a human body) were recorded by under the same image recording conditions, i.e. the characteristics of the recorded images were the same.

When the probability density function shown in FIG. 4B is compared with that shown in FIG. 4A, projecting portions B' and C' approximate the projecting portions B and C, respectively. However, a projecting portion A' differs from the projecting portion A, in that it is divided into two projecting portions, A1' and A2'.

When the method described above is applied to the probability density function shown in FIG. 4B, the values of the probability density function are compared to the predetermined threshold value T. Starting from the value of the function corresponding to the minimum value SL' of the preliminary read-out image signal SP', whenever the value of the function crosses over the threshold value T, a calculation is made as to whether the function is rising or falling. In this manner, a second rising point a' and a second falling point b' are found. However, the range of the preliminary read-out image signal SP' between the points a' and b' is different and far apart from the range (of the projecting portion B') corresponding to the parts of the radiation image, which it is necessary to reproduce. If the final read-out operation is carried out so that during the final read-out the image information represented by an emitted light signal with values falling within the range between the points a' and b' is detected as an image signal with values lying on a straight line G', the image signal thus obtained will not contain the necessary image information, and cannot yield a useful visible image. In such cases, the recording of the radiation image of the object must be repeated.

Besides the extreme case described above, an inaccurate EDR deteriorates the image quality of a reproduced visible image.

SUMMARY OF THE INVENTION

The primary object of the present invention is to provide a radiation image read-out apparatus wherein the recording of an image or the reproduction of a visible image need not be repeated when an EDR is not carried out accurately.

Another object of the present invention is to provide a radiation image read-out apparatus which facilitates the reproduction of a visible image having good image quality.

FIG. 1A is a block diagram showing the general configuration of the first radiation image read-out apparatus in accordance with the present invention wherein a preliminary read-out image signal obtained by a preliminary read-out operation is utilized.

With reference to FIG. 1A, the first radiation image read-out apparatus in accordance with the present invention comprises:

(i) a preliminary read-out means 1 for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal SP which approximately represents said radiation image, (ii) a final read-out means 2 for scanning said stimulable phosphor sheet with a light beam having an energy intensity higher than that of said light beam used in said preliminary read-out means 1, detecting light emitted by said stimulable phosphor sheet when it is thus scanned, and obtaining an image signal SQ which represents said radiation image, (iii) an image processing means 3 for receiving said image signal SQ and carrying out image processing of said image signal SQ, and (iv) a condition adjusting means 4 for receiving said preliminary read-out image signal SP, adjusting a read-out condition C1 for use in obtaining said image signal SQ and/or an image processing condition C2 for use in carrying out image processing, said adjustment being effected on the basis of information carried by said preliminary read-out image signal SP, and feeding said read-out condition C1 into said final read-out means 2 and/or feeding said image processing condition C2 into said image processing means 3.

Said condition adjusting means 4 is constituted of:

(a) a storage section 4a for storing said preliminary read-out image signal SP, (b) an operating section 4b for reading said preliminary read-out image signal SP from said storage section 4a, carrying out an operating process based on said preliminary read-out image signal SP in order to calculate a read-out condition C1 to be used in obtaining an image signal SQ and/or an image processing condition C2 to be used in carrying out image processing of an image signal SQ, (c) a judging section 4c for judging the reliability of said read-out condition C1 and/or said image processing condition C2 which were calculated by said operating section 4b, and (d) a displaying section 4d for indicating low reliability in cases where the judging section 4c judges that the reliability of said read-out condition C1 and/or said image processing condition C2 is low.

The radiation image read-out apparatus in accordance with the present invention may also be constituted to display the read-out condition C1 and/or the image processing condition C2, instead of judging the reliability of the read-out condition C1 and/or the image processing condition C2 which were calculated by the operating section 4b.

FIG. 1B is a block diagram showing the general configuration of the second radiation image read-out apparatus in accordance with the present invention, wherein a preliminary read-out operation is carried out and a read-out condition C1 and/or an image processing condition C2 is displayed without the reliability thereof being judged. In FIG. 1B, similar elements are numbered with the same reference numerals with respect to FIG. 1A.

With reference to FIG. 1B, the second radiation image read-out apparatus in accordance with the present invention comprises the preliminary read-out means 1, the final read-out means 2, the image processing means 3, and a condition adjusting means 5. The condition adjusting means 5 is different from the condition adjusting means 4 shown in FIG. 1A. Specifically, the condition adjusting means 5 is constituted of:

(a) a storage section 5a for storing said preliminary read-out image signal SP, (b) an operating section 5b for reading said preliminary read-out image signal SP from said storage section 5a, and carrying out an operating process based on said preliminary read-out image signal SP in order to calculate a read-out condition C1 to be used in obtaining an image signal SQ and/or an image processing condition C2 to be used in carrying out image processing of an image signal SQ, (c) a displaying section 5c for displaying said read-out condition C1 and/or said image processing condition C2, which were calculated by said operating section 5b, and (d) an entry section 5d for entering an instruction, which specifies whether said read-out condition C1 and/or said image processing condition C2 displayed at said displaying section 5c is or is not appropriate, into said operating section 5b.

The radiation image read-out apparatus in accordance with the present invention is also applicable to cases wherein no preliminary read-out operations are carried out. However, in such cases, the image processing condition is calculated, while the read-out condition is not calculated.

FIGS. 1C and 1D are block diagrams showing general configurations of the third and fourth radiation image read-out apparatuses in accordance with the present invention, wherein no preliminary read-out operations are carried out. The general configurations shown in FIGS. 1C and 1D correspond respectively to those shown in FIGS. 1A and 1B, except that no preliminary read-out operations are carried out by the apparatuses of FIGS. 1C and 1D.

With reference to FIG. 1C, the third radiation image read-out apparatus in accordance with the present invention comprises:

(i) a read-out means 2' for obtaining an image signal SQ by reading out a radiation image from a recording medium, such as a stimulable phosphor sheet or a photographic film, on which the radiation image has been recorded, (ii) an image processing means 3 for receiving said image signal SQ and carrying out image processing of said image signal SQ, and (iii) a condition adjusting means 4' for receiving said image signal SQ, adjusting an image processing condition C2' to be used in carrying out image processing, said adjustment being effected on the basis of said image signal SQ, and feeding said image processing condition C2' into said image processing means 3, wherein said condition adjusting means 4' is constituted of:

(a) a storage section 4a' for storing said image signal SQ, (b) an operating section 4b' for reading said image signal SQ from said storage section 4a', and carrying out an operating process based on said image signal SQ in order to calculate an image processing condition C2' for use in carrying out image processing, (c) a judging section 4c' for judging the reliability of said image processing condition C2' calculated by said operating section 4b', and (d) a displaying section 4d' for indicating low reliability in cases where the judging section 4c' judges that the reliability of said image processing condition C2 is low.

With reference to FIG. 1D, the fourth radiation image read-out apparatus in accordance with the present invention comprises the read-out means 2', the image processing means 3, and a condition adjusting means 5'. The condition adjusting means 5' is different from the condition adjusting means 4' shown in FIG. 1C. Specifically, the condition adjusting means 5' is constituted of:

(a) a storage section 5a' for storing said image signal SQ, (b) an operating section 5b' for reading said image signal SQ from said storage section 5a', and carrying out an operating process based on said image signal SQ in order to calculate an image processing condition C2' to be used in carrying out image processing, (c) a displaying section 5c' for displaying said image processing condition C2' calculated by said operating section 5b', and (d) an entry section 5d' for entering an instruction into said operating section 5b', which instruction specifies whether said image processing condition C2' displayed at said displaying section 5c' is or is not appropriate.

In preferred embodiments of the radiation image read-out apparatuses in accordance with the present invention which are shown in FIGS. 1C and 1D, light which is obtained from the recording medium and which represents the radiation image recorded on the recording medium is photoelectrically detected and converted into an image signal. The term "light obtained from a recording medium and representing a radiation image" as used herein embraces light emitted by a stimulable phosphor sheet when it is exposed to stimulating rays, and light which has passed through a photographic film or is reflected therefrom.

Judgment of the reliability of the read-out condition C1 and/or the image processing condition C2 or the image processing condition C2', which is carried out by the judging section 4c shown in FIG. 1A or the judging section 4c' shown in FIG. 1C, is effected on the basis of, for example, the algorithm described below. (The read-out condition C1 and/or the image processing condition C2 or the image processing condition C2' will hereinafter be referred to jointly as a setting condition.

First, a large number of image signals detected from a large number of radiation images are classified in accordance with the characteristics of the recorded images. Such characteristics include, for example, what portion of an object is represented by the recorded image (e.g. the head, the chest or the abdomen in cases where the object is a human body) and what recording mode was used when the image was recorded (e.g. an ordinary image recording mode, a contrasted image recording mode or an enlarged image recording mode). The statistical processing of the large number of image signals yields a mean value $\bar{S}$ and a variance $\sigma(S)$ of the sensitivities S of the range of the amounts of emitted light required to be detected in order to obtain the necessary image information in the finally reproduced image (for example, the range from Smin to Smax in the case of FIG. 4A), and/or a mean value $\bar{L}$ and a variance $\sigma(L)$ of the latitude L of the range of the amounts of emitted light required to be detected in order to obtain the necessary image information in the finally reproduced image. Thereafter, for each characteristic of the recorded image, the allowable range of the sensitivity S and/or the latitude L expressed as $$\bar{S} - k \cdot \sigma(S) \sim \bar{S} + k \cdot \sigma(S),$$

$$\bar{L} - k' \cdot \sigma(L) \sim \bar{L} + k' \cdot \sigma(L),$$

$$(k, k' > 0)$$

is calculated.

For the setting condition calculated by the operating section 4b shown in FIG. 1A or by the operating section 4b' shown in FIG. 1C, the judging section 4c or 4c' investigates whether the sensitivity S satisfies or does not satisfy the condition $$\bar{S} - k \cdot \sigma(S) \leq S \leq \bar{S} + k \cdot \sigma(S)$$

and/or whether the latitude L satisfies or does not satisfy the condition $$\bar{L} - k' \cdot \sigma(L) \leq L \leq \bar{L} + k' 19 \, \sigma(L)$$

In cases where this condition is satisfied, the judging section 4c or 4c' judges that the reliability of the setting condition is high. In cases where this condition is not satisfied, the judging section 4c or 4c' judges that the reliability of the setting condition is low.

The term "sensitivity S" as used herein means a representative value of the amount of emitted light required to be detected in order ultimately to reproduce the necessary image information (for example, the amounts of emitted light corresponding to the projecting portion B in FIG. 4A). For example, by using the maximum value Smax and the minimum value Smin of the projecting portion B shown in FIG. 4B, the sensitivity S is expressed as $$S = \frac{\log Smax + \log Smin}{2}$$

Also, the term "latitude L" as used herein means the width of the range in the values of the emitted light which must be detected in order ultimately to reproduce the necessary image information, for example, the difference between the logarithmic values of the maximum value Smax and the minimum value Smin shown in FIG. 4A, i.e.

$$L = \log Smax - \log Smin$$

The allowable range in the values of the sensitivity S and the latitude L may be selected in advance and fixed for each characteristic of the recorded image, or may be changed in accordance with an image signal which is obtained later.

Alternatively, the reliability of the setting condition may be judged in accordance with the algorithm described below.

As described above with reference to FIG. 4A, the projecting portion B (the range in the amounts of the emitted light which must be detected in order ultimately to reproduce a visible image containing the necessary image information) is found by comparing the values of the probability density function with the threshold value T in order to detect the points "a" and "b". (Hereinbelow "the range in the amounts of the emitted light which must be detected in order ultimately to reproduce a visible image containing the necessary image information" will be shortened to "the range of necessary image information.") The range in the amounts of emitted light corresponding to the range between the points "a" and "b" is taken as the range of necessary image information. Specifically, in this method, both the maximum value and the minimum value in the range of necessary image information are detected as disclosed in Japanese Unexamined Patent Publication No. 60(1985)-156055. It is also possible to employ (1) a method as disclosed in Japanese Unexamined Patent Publication No. 60(1985)-185944 wherein only the maximum value corresponding to the point "b" shown in FIG. 4A is determined, a value obtained by subtracting a predetermined value from the maximum value is taken as the minimum value, and the range between the maximum value and the minimum value is taken as the range of necessary image information, (2) a method as disclosed in Japanese Unexamined Patent Publication No. 61(1986)-280163 wherein only the minimum value corresponding to the point "a" shown in FIG. 4A is determined, a value obtained by adding a predetermined value to the minimum value is taken as the maximum value, and the range, between the minimum value and the maximum value is taken as the range of necessary image information, (3) a method as proposed in Japanese Patent Application No. 62(1987)-67302 wherein a difference histogram is used, (4) a method as disclosed in Japanese Unexamined Patent Publication No. 61(1986)-170730 wherein a cumulative histogram is used, or (5) a method as proposed in Japanese Patent Application No. 62(1987)-96716 wherein a histogram is divided into a plurality of small regions by using a discrimination standard.

Accordingly, the operating section 4b or 4b' may be constituted so as to find a plurality of ranges of necessary image information by several of the methods among those above enumerated methods. When the sensitivities S and/or latitudes L fall within the allowable range, it indicates that the reliability of the setting condition may be judged to be high. Conversely, when the values of the sensitivity S and/or the latitudes L go beyond a predetermined range, the reliability of the setting condition may be judged to be low. In cases where the reliability of the setting condition is judged to be high, a mean range of the plurality of the ranges of necessary image information is calculated, and a setting condition is adjusted based on the mean range of necessary image information.

As described above, the judgment method used in the judging sections 4c and 4c' shown in FIGS. 1A and 1C is not limited to a particular method.

With the first and third radiation image read-out apparatuses shown in FIGS. 1A and 1C, the reliability of the setting condition calculated by the operating section 4b or 4b' is judged by the judging section 4c or 4c'. When the reliability of the setting condition is judged to be low, the displaying section 4d or 4d' indicates that the reliability is low. Therefore, when the reliability is judged to be high, image processing or the like can be carried out by employing the setting condition calculated by the operating section 4b or 4b'. When the reliability is judged to be low, various operations can be carried out, for example, a different setting condition can be manually entered after confirming the indication of low reliability on the displaying section 4d or 4d'. Accordingly, an operator need not repeat the image recording step, and a visible image having a high image quality can be obtained.

With the second and fourth radiation image read-out apparatuses shown in FIGS. 1B and 1D, the setting condition calculated by the operating section 5b or 5b' is displayed at the displaying section 5c or 5c', and an instruction indicating whether the setting condition displayed at the displaying section 5c or 5c' is or is not appropriate is entered from the entry section 5d or 5d'. Therefore, it is possible to prevent an inappropriate setting condition from being used in image processing or the like. Accordingly, an operator need not repeat the image recording step, and a visible image having good image quality can be obtained.

BRIEF DESCRIPTION OF THE DRAWINGS

FIGS. 1A, 1B, 1C and 1D are block diagrams showing general configurations of the first to fourth radiation image read-out apparatuses in accordance with the present invention, FIGS. 2A and 2B are perspective views showing embodiments of the radiation image read-out apparatuses in accordance with the present invention.

DESCRIPTION OF THE PREFERRED EMBODIMENTS

Figure 2C:
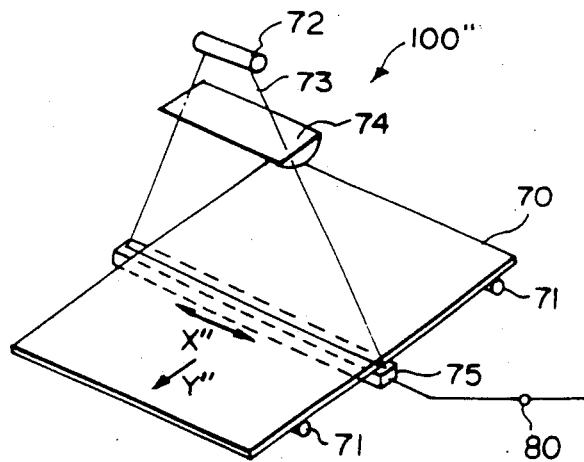
FIG. 2C is a perspective view showing a read-out means employed in an embodiment of the X-ray image read-out apparatus in accordance with the present invention, wherein an X-ray image recorded on an X-ray film is read out.

The present invention will hereinbelow be described in further detail with reference to the accompanying drawings.

With reference to FIG. 2A, an embodiment of the radiation image read-out apparatus in accordance with the present invention utilizes a stimulable phosphor sheet and carries out a preliminary read-out operation.

A stimulable phosphor sheet 11 on which a radiation image has been stored is placed at a predetermined position in a preliminary read-out means 100 which carries out a preliminary read-out operation by scanning the stimulable phosphor sheet 11 with a light beam having a low energy level, thereby releasing only part of the energy stored during exposure to radiation from the stimulable phosphor sheet 11. The stimulable phosphor sheet 11 is conveyed in a sub-scanning direction indicated by the arrow Y by a sheet conveyance means 13 constituted of an endless belt or the like operated by a motor 12. On the other hand, stimulating rays 15 produced by a laser beam source 14 are reflected and deflected by a rotating polygon mirror 16, which is quickly rotated by a motor 23 in the direction indicated by the arrow, and the stimulating rays 15 pass through a converging lens 17 constituted of an $f\theta$ lens or the like. The direction of the optical path of the stimulating rays 15 is then changed by a mirror 18, and the stimulating rays 15 impinge upon the stimulable phosphor sheet 11 and scan across it in a main scanning direction indicated by the arrow X, which main scanning direction is approximately normal to the sub-scanning direction indicated by the arrow Y. When the stimulable phosphor sheet 11 is exposed to the stimulating rays 15, the exposed portion of the stimulable phosphor sheet 11 emits light 19 with an intensity proportional to the amount of energy stored during exposure to radiation. The emitted light 19 is guided by a light guide member 20, and photoelectrically detected by a photomultiplier 21 which acts as a photodetector. The light guide member 20 is made from a light guiding material such as an acrylic plate, and has a linear light input face 20a positioned so that it extends along the main scanning line on the stimulable phosphor sheet 11, and a ring-shaped light output face 20b is positioned in close contact with a light receiving face of the photomultiplier 21. The emitted light 19 entering the light guide member 20 through its light input face 20a is guided through repeated total reflection inside of the light guide member 20, emanates from the light output face 20b, and is received by the photomultiplier 21. In this manner, the intensity of the emitted light 19, which carries the information about the radiation image, is detected by the photomultiplier 21.

An analog output signal S generated by the photomultiplier 21 is amplified by an amplifier 26, and digitized by an A/D converter 27 into a preliminary read-out image signal SP.

In the preliminary read-out operation, a read-out condition such as the voltage applied to the photomultiplier 21 or the amplification factor of the amplifier 26 is adjusted so that image information can be detected for a wide range in the amount of radiation energy stored on the stimulable phosphor sheet 11.

Figure 4A:
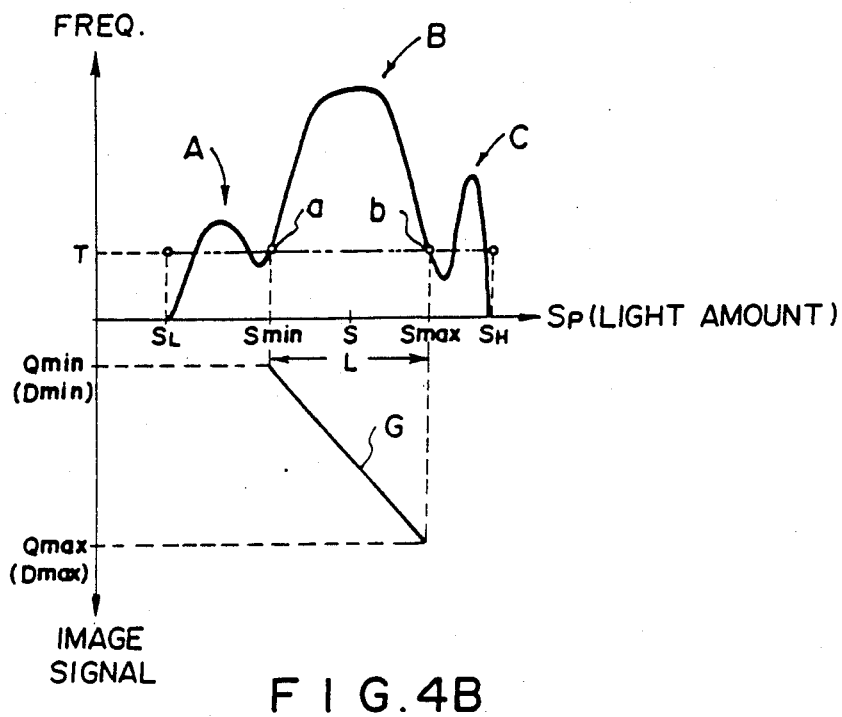
FIGS. 4A and 4B are graphs showing probability density functions of preliminary read-out image signals.
Figure 4B:
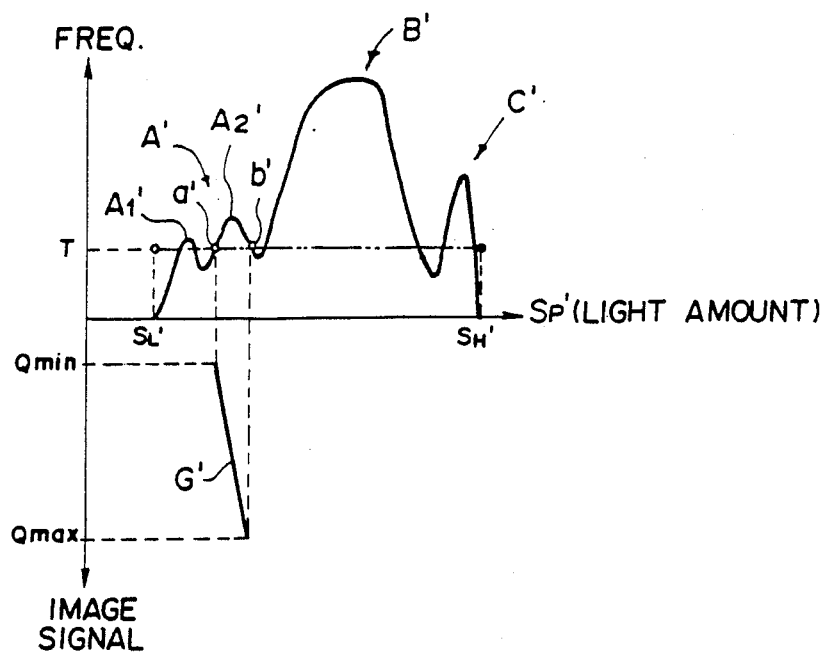

The preliminary read-out image signal SP obtained in the manner described above is fed into a storage section 28 in a condition adjusting means 200 and stored therein. Thereafter, the preliminary read-out image signal SP is read from the storage section 28, and fed into an operating section 29. The operating section 29 calculates the read-out condition (which causes the graph of the image signal to correspond to the straight line G in FIG. 4A) for the final read-out on the basis of the preliminary read-out image signal SP. The read-out condition thus calculated is fed into a judging section 30, which judges the reliability of the read-out condition by investigating whether the sensitivity and the latitude of the range of emitted light amounts which are to be detected fall or do not fall within the predetermined range of allowable sensitivities and latitudes. In cases where the reliability is judged to be high, the voltage applied to a photomultiplier 21' in a final read-out means 100' and the amplification factor of an amplifier 26' of the final read-out means 100' are set in accordance with the read-out condition calculated by the operating section 29. In cases where the reliability is judged to be low, a CRT display device 31 which acts as a displaying section indicates that the reliability is low. The CRT display device 31 also displays the read-out condition which has been judged to be unreliable. An operator confirms the indication on the CRT display device 31, and judges whether the final read-out operation may be or may not be carried out using the read-out condition which has been calculated by the operating section 29 and which has been judged to be unreliable by the judging section 30. In cases where the final read-out operation may be carried out using said read-out condition, a command to carry out the final read-out operation is entered at a keyboard 32. In cases where a different read-out condition is selected, an alternate read-out condition is entered at the keyboard 32. The voltage applied to the photomultiplier 21' and the amplification factor of the amplifier 26' are set in accordance with the read-out condition which has been entered.

A stimulable phosphor sheet 11' on which the preliminary read-out has been finished is placed at a predetermined position in the final read-out means 100', and scanned with a light beam 15' having an energy level higher than that of the light beam 15 used in the preliminary read-out operation. In this manner, an image signal SQ is detected by using the read-out condition adjusted as described above. The configuration of the final read-out means 100' is nearly the same as that of the preliminary read-out means 100, and therefore elements corresponding to those constituting the preliminary read-out means 100 are numbered with corresponding primed reference numerals in FIG. 2A.

After it is digitized in an A/D converter 27', the image signal SQ is fed into an image processing means 50, which carries out appropriate image processing of the image signal SQ. After being image processed, the image signal is fed into a reproducing apparatus 60, which reproduces a visible image by use of the image signal.

In the aforesaid embodiment, the read-out condition for the final read-out is adjusted by the condition adjusting means 200. Alternatively, the final read-out may be carried out by using a predetermined read-out condition regardless of the characteristics of the preliminary read-out image signal SP. On the basis of the preliminary read-out image signal SP, the condition adjusting means 200 may adjust an image processing condition which is to be used in the image processing means 50 for carrying out image processing of the image signal SQ. The image processing condition calculated by the condition adjusting means 200 may then be fed into the image processing means 50 as indicated by the chained line in FIG. 2A. The condition adjusting means 200 may also adjust both the read-out condition and the image processing condition.

Another embodiment of the radiation image read-out apparatus in accordance with the present invention will hereinbelow be described with reference to FIG. 2B. In FIG. 2B, similar elements are numbered with the same reference numerals with respect to FIG. 2A.

The preliminary read-out image signal SP generated by the A/D converter 27 is fed into a storage section 28' in a condition adjusting means 200' and stored therein. Thereafter, the preliminary read-out image signal SP is read from the storage section 28', and fed into an operating section 29'. The operating section 29' calculates a read-out condition (which results in an image signal, the graph of which corresponds to the straight line G in FIG. 4A) on the basis of the preliminary read-out image signal SP. The read-out condition which has been calculated is displayed on a CRT display device 31' which acts as a displaying section. An operator confirms the read-out condition displayed on the CRT display device 31', and enters an instruction, which specifies whether the displayed read-out condition is or is not appropriate, at a keyboard 32' which constitutes an entry section into the operating section 29'. In cases where the displayed read-out condition is inappropriate, a different read-out condition is entered at the keyboard 32'. The operating section 29' feeds the selected read-out condition into the final read-out means 100'. In accordance with said read-out condition, the voltage applied to the photomultiplier 21' and the amplification factor of the amplifier 26' are set.

In the embodiments shown in FIGS. 2A and 2B, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary read-out operation and the final read-out operation. In this case, after the preliminary read-out operation is carried out by scanning the stimulable phosphor sheet 11 with a light beam having a low energy level, the stimulable phosphor sheet 11 may be moved back to the position at which the image read-out operations are started. Thereafter, the final read-out operation may be carried out by scanning the stimulable phosphor sheet 11 with a light beam having a high energy level.

In cases where a single read-out means is utilized to perform both the preliminary read-out operation and the final read-out operation, it is necessary to change the intensity of the light beam used in the preliminary read-out operation and the final read-out operation. For this purpose, a laser beam source or the like may change the intensity of the light beam, or the intensity of the light beam may be changed by moving an ND filter or the like into and out of the optical path of the light beam. Alternatively, the diameter of the light beam may be changed, or the speed with which the phosphor sheet is scanned may be changed.

The present invention is also applicable to radiation image read-out apparatuses wherein no preliminary read-out operations are carried out and only the aforesaid final read-out operations are carried out. In these cases, an image signal is obtained by using a predetermined read-out condition. Based on the image signal, an image processing condition is calculated by a condition adjusting means. The calculated image processing condition is taken into consideration when the image signal is processed.

The present invention is not limited to the aforesaid embodiments wherein a stimulable phosphor sheet is used, and is also applicable to, for example, an X-ray image read-out apparatus wherein conventional X-ray film is used.

With reference to FIG. 2C, a sheet of X-ray film 70 on which an X-ray image has been recorded is placed at a predetermined position in a read-out means 100", and is conveyed in the direction indicated by the arrow Y'" by a film conveyance means 71.

Reading light 73 produced by an elongated light source 72 extending in one direction is converged by a cylindrical lens 74, and is linearly irradiated onto the X-ray film 70 along the directions indicated by the arrow X'", which are approximately normal to the direction indicated by the arrow Y'". A MOS sensor 75 is positioned below the X-ray film 70 so that the MOS sensor 75 can receive the reading light 73 which has passed through the X-ray film 70, the intensity of which light has been modulated in accordance with the X-ray image recorded on the X-ray film 70. The MOS sensor 75 comprises a plurality of solid state photoelectric conversion devices which are arrayed linearly at intervals equal to the intervals between the picture elements of the X-ray image along the directions indicated by the arrow X'". As long as the X-ray film 70 is conveyed in the direction indicated by the arrow Y'" while being exposed to the reading light 73, the MOS sensor 75 detects the reading light, which has passed through the X-ray film 70, at predetermined intervals corresponding to the intervals between the picture elements of the X-ray image along the direction indicated by the arrow Y'".

Figure 3:
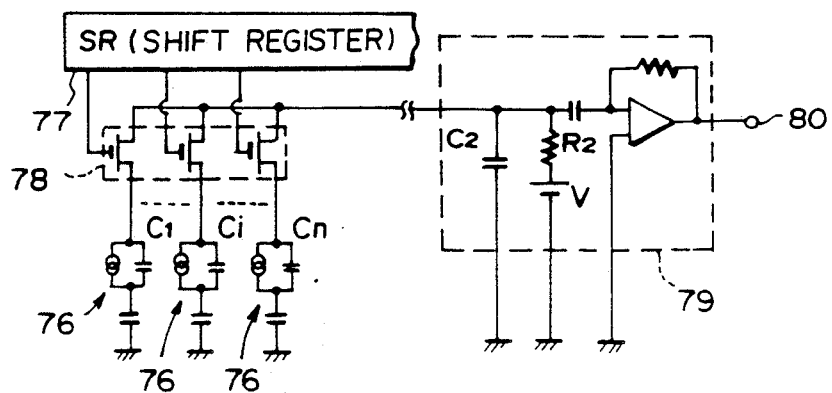
FIG. 3 is a circuit diagram showing an equivalent circuit for a MOS sensor.

FIG. 3 shows an equivalent circuit for the MOS sensor 75.

With reference to FIG. 3, photocarriers generated when the reading light 73 impinges upon the solid state photoelectric conversion devices 76, 76, ... accumulate in capacitors Ci (i = 1, 2, ..., n) of the solid state photoelectric conversion devices 76, 76, .... The number of photocarriers which accumulate in the capacitors Ci is detected by sequentially turning on and off the switches of a switch section 78. A shift register 77 controls the switches of the switch section 78, and a time-serial image signal is obtained. The image signal is then amplified by a pre-amplifier 79 and is output at an output terminal 80 of the pre-amplifier 79.

The analog image signal output by the MOS sensor 75 is amplified by an amplifier 26", and digitized into an image signal SQ' by a A/D converter 27". The image signal SQ' is fed into a condition adjusting means. Thereafter, in the same manner as in the embodiment shown in FIG. 2A, an image processing condition is calculated, and the reliability of the image processing condition is evaluated. When the reliability of the image processing condition is judged to be low, a displaying section indicates that the reliability of the image processing condition is low. Alternatively, in the same manner as in the embodiment shown in FIG. 2B, the calculated image processing condition is displayed, and an instruction specifying whether the image processing condition is or is not appropriate is entered into an operating section.

In the embodiment shown in FIG. 2C, the MOS sensor 75 may be replaced by a charge coupled device (CCD) or a charge priming device (CPD). Also, the X-ray image may be read out from the X-ray film 70 by two-dimensionally scanning the X-ray film 70 with a light beam in the same manner as that described above for image read-out from the stimulable phosphor sheet. Furthermore, instead of detecting light which has passed through the X-ray film 70, light reflected by the X-ray film 70 may be detected.

The present invention is applicable to various types of radiation image read-out apparatuses wherein an image signal is obtained by reading out a radiation image from a recording medium, on which the radiation image has been recorded, and wherein the image signal is processed in accordance with an image processing condition.

I claim:

1. A radiation image read-out apparatus comprising:
   (i) a preliminary read-out means for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal which approximately represents said radiation image,
   (ii) a final read-out means for scanning said stimulable phosphor sheet with a light beam having an energy intensity higher than that of said light beam used in said preliminary read-out means, detecting light emitted by said stimulable phosphor sheet when it is thus scanned, and obtaining a final read-out image signal which represents said radiation image,
   (iii) an image processing means for receiving said final read-out image signal and carrying out image processing of said final read-out image signal, and
   (iv) a condition adjusting means for receiving said preliminary read-out image signal, adjusting a read-out condition for use in obtaining said final read-out image signal and/or an image processing condition for use in carrying out image processing, said adjustment being effected on the basis of information carried by said preliminary read-out image signal, and feeding said read-out condition into said final read-out means and/or feeding said image processing condition into said image processing means,
   wherein said condition adjusting means is constituted of:
   (a) a storage section for storing said preliminary read-out image signal,
   (b) an operating section for reading said preliminary read-out image signal from said storage section, carrying out an operating process based on said preliminary read-out image signal in order to calculate a read-out condition to be used in obtaining a final read-out image signal and/or an image processing condition to be used in carrying out image processing of a final read-out image signal,
   (c) a judging section for judging the reliability of said read-out condition and/or said image processing condition which were calculated by said operating section, and
   d) a displaying section for indicating low reliability in cases where the judging section judges that reliability of said read-out condition and/or said image processing condition is low.

2. An apparatus as defined in claim 1 wherein said light beam is a laser beam.

3. A radiation image read-out apparatus comprising:
   (i) a preliminary read-out means for scanning a stimulable phosphor sheet, on which a radiation image has been stored, with a light beam in order to release part of the energy stored during exposure to radiation as light emitted from said stimulable phosphor sheet, detecting the light emitted by said stimulable phosphor sheet, and obtaining a preliminary read-out image signal which approximately represents said radiation image,
   (ii) a final read-out means for scanning said stimulable phosphor sheet with a light beam having an energy intensity higher than that of said light beam used in said preliminary read-out means, detecting light emitted by said stimulable phosphor sheet when it is thus scanned, and obtaining a final read-out image signal which represents said radiation image,
   (iii) an image processing means for receiving said final read-out image signal and carrying out image processing of said final read-out image signal, and
   (iv) a condition adjusting means for receiving said preliminary read-out image signal, adjusting a read-out condition for use in obtaining said final read-out image signal and/or an image processing condition for use in carrying out image processing, said adjustment being effected on the basis of information carried by said preliminary read-out image signal, and feeding said read-out condition into said final read-out means and/or feeding said image processing condition into said image processing means,
   wherein said condition adjusting means is constituted of:
   (a) a storage section for storing said preliminary read-out image signal,
   (b) an operating section for reading said preliminary read-out image signal from said storage section, carrying out an operating process based on said preliminary read-out image signal in order to calculate a read-out condition to be used in obtaining a final read-out image signal and/or an image processing condition to be used in carrying out image processing of a final read-out image signal,
   (c) a displaying section for displaying said read-out condition and/or said image processing condition which were calculated by said operating section, and
   (d) an entry section for entering an instruction, which specifies whether said read-out condition and/or said image processing condition displayed at said displaying section is or is not appropriate, into said operating section.

4. An apparatus as defined in claim 3 wherein said light beam is a laser beam.

5. A radiation image read-out apparatus comprising:
   (i) a read-out means for obtaining an image signal by reading out a radiation image from a recording medium on which the radiation image has been recorded,
   (ii) an image processing means for receiving said image signal and carrying out image processing of said image signal, and
   (iii) a condition adjusting means for receiving said image signal, adjusting an image processing condition to be used in carrying out image processing, said adjustment being effected on the basis of said image signal, and feeding said image processing condition into said image processing means, wherein said condition adjusting means is constituted of:

(a) a storage section for storing said image signal, (b) an operating section for reading said image signal from said storage section, and carrying out an operating process based on said image signal in order to calculate an image processing condition for use in carrying out image processing, (c) a judging section for judging the reliability of said image processing condition calculated by said operating section, and (d) a displaying section for indicating low reliability in cases where the judging section judges that the reliability of said image processing condition is low.

6. An apparatus as defined in claim 5 wherein said recording medium is a stimulable phosphor sheet on which a radiation image has been stored, and said read-out means obtains said image signal by scanning said stimulable phosphor sheet with a light beam in order to release the energy stored thereon during exposure to radiation as light emitted from said stimulable phosphor sheet, and detecting the light emitted by said stimulable phosphor sheet.

7. An apparatus as defined in claim 6 wherein said light beam is a laser beam.

8. A radiation image read-out apparatus comprising:

(i) a read-out means for obtaining an image signal by reading out a radiation image from a recording medium on which the radiation image has been recorded, (ii) an image processing means for receiving said image signal and carrying out image processing of said image signal, and (iii) a condition adjusting means for receiving said image signal, adjusting an image processing condition to be used in carrying out image processing, said adjustment being effected on the basis of said image signal, and feeding said image processing condition into said image processing means, wherein said condition adjusting means is constituted of:

(a) a storage section for storing said image signal, (b) an operating section for reading said image signal from said storage section, and carrying out an operating process based on said image signal in order to calculate an image processing condition for use in carrying out image processing, (c) a displaying section for displaying said image processing condition calculated by said operating section, and (d) an entry section for entering an instruction into said operating section, which instruction specifies whether said image processing condition displayed at said displaying section is or is not appropriate.

9. An apparatus as defined in claim 8 wherein said recording medium is a stimulable phosphor sheet on which a radiation image has been stored, and said read-out means obtains said image signal by scanning said stimulable phosphor sheet with a light beam in order to release the energy stored thereon during exposure to radiation as light emitted from said stimulable phosphor sheet, and detecting the light emitted by said stimulable phosphor sheet.

10. An apparatus as defined in claim 9 wherein said light beam is a laser beam.

* * * * *